No. 619,721.  
Patented Feb. 21, 1899.
LA FAYETTE CONWELL.
BICYCLE BRAKE AND CLUTCH.
(Application filed Mar. 12, 1897.)
(No Model.)
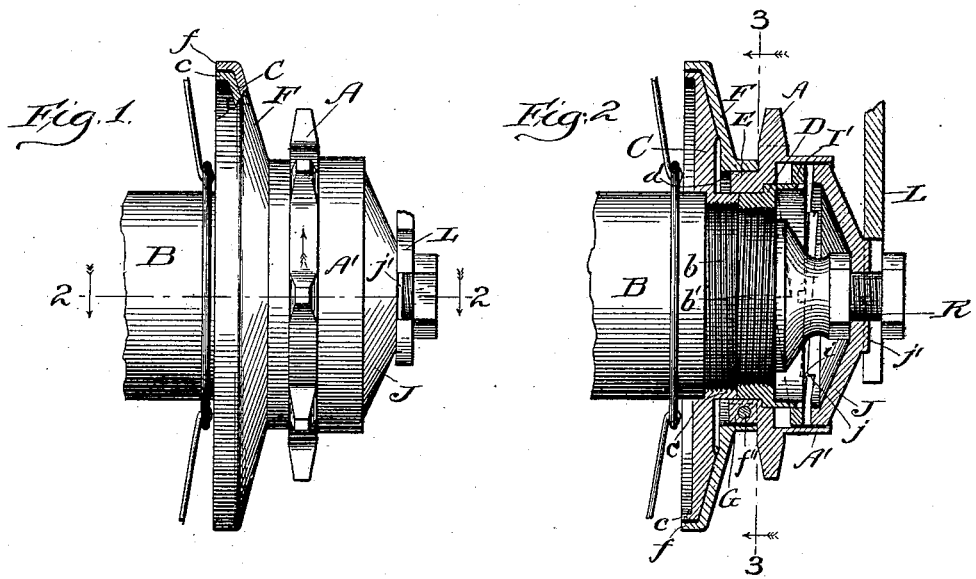
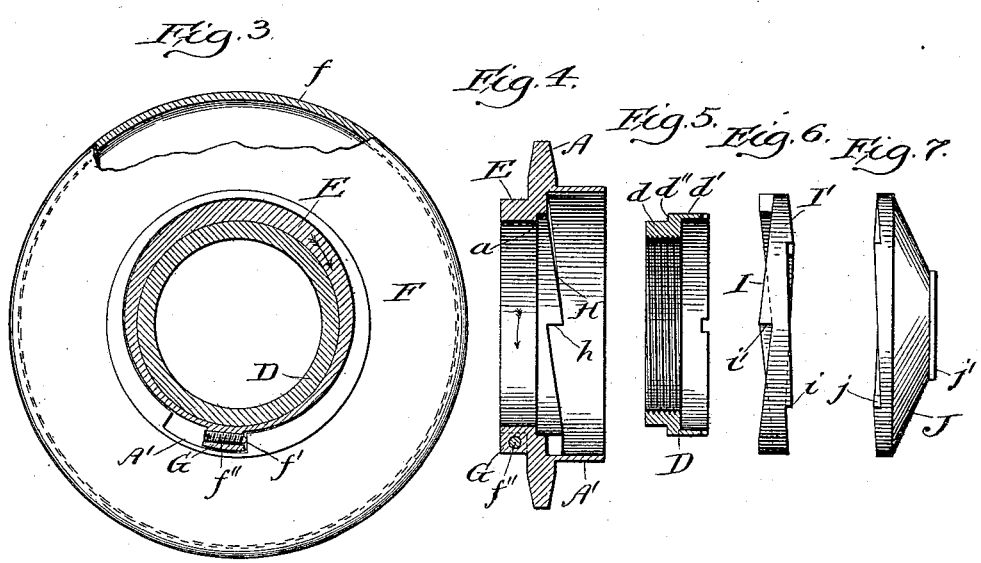
Witnesses  
Martin H. Olsen  
S. Cross
Inventor  
La Fayette Conwell  
By Greeley & Hopkins  
His attorneys
THE NORRIS PETERS CO., PHOTO-LITHO., WASHINGTON, D. C.

UNITED STATES PATENT OFFICE.

LA FAYETTE CONWELL, OF CHICAGO, ILLINOIS, ASSIGNOR, BY DIRECT AND MESNE ASSIGNMENTS, TO ALLEN McQUARRIE, G. ALBERT McCOLLUM, AND JOHN JOSEPH SCHAEFER, OF SAME PLACE.

BICYCLE BRAKE AND CLUTCH.

SPECIFICATION forming part of Letters Patent No. 619,721, dated February 21, 1899.

Application filed March 12, 1897. Serial No. 627,156. (No model.)

*To all whom it may concern:*

Be it known that I, LA FAYETTE CONWELL, a citizen of the United States, residing at Chicago, in the county of Cook and State of Illinois, have invented certain new and useful Improvements in Clutches and Brakes, of which the following is a specification.

One part of the present invention relates to the construction of a clutch whereby motion is transmitted from a part, hereinafter called the "driving" member, to a second part, hereinafter called the "driven" member. This part of my invention may be used in any machine whose requirements are such that it is desirable to have a clutch by which the driving and driven members may be quickly connected or disconnected at the will of the operator, but it is especially adapted for use in bicycles and similar light machines.

The invention relates in part also to a brake for retarding or arresting the rotation of a driven member, and particularly to that class of brakes which are operated by a reverse movement of some part of the driving mechanism. This part of my invention may be embodied in any machine the requirements of which make such a brake desirable, but it is especially adapted for embodiment in bicycles and similar light machines. These two parts of my invention are by preference so combined in a single structure that the part hereinbefore termed the "driving" member enters into the construction and forms a part of both the clutch and the brake, the arrangement being such that when said driving member is rotated in one direction (forward) at a speed higher than that of the driven member it will cause the two members of the clutch to engage and when so engaged serve to transmit movement from the driving to the driven member, while at the same time when this same driving member is rotated in the reverse direction (backward) it will operate to apply the brake and either retard or arrest the driven member, depending upon the extent of the reverse movement. While I prefer to combine these two mechanisms so that they are to a certain extent interdependent, still I desire to have it understood that in its broadest aspect my invention is not limited to their being combined, but, on the contrary, within the scope of my invention either may be modified in its construction or omitted entirely.

The invention consists in the features of novelty that are hereinafter fully described, and in order that it may be fully understood I will describe it with reference to the accompanying drawings, which are made a part of this specification, and in which—

Figure 1 is an elevation of a brake and a clutch combined embodying all of the several features of my invention in their preferred form. Fig. 2 is an axial section thereof on the line 2 2, Fig. 1. Fig. 3 is a transverse section thereof on the line 3 3, Fig. 2, looking in the direction of the arrow. Figs. 4 and 5 are axial sections, and Figs. 6 and 7 are elevations of some of the parts separated.

A represents the driving and B the driven member. In the embodiment of my invention which I have chosen for the purpose of illustration these parts are respectively the sprocket-wheel and the driving-wheel of a bicycle or similar light machine.

In a bicycle of modern construction the hub of the driving-wheel is provided at $b$ with a right-hand thread onto which the sprocket-wheel is screwed and at $b'$ with a left-hand thread onto which the lock-nut for confining the sprocket-wheel is screwed. In order to make my present invention applicable to a modern bicycle without requiring any alteration whatever in the construction of the rear wheel, I make use of these two threaded portions of the hub. Onto the threaded portion $b$ I screw a part C, which is in the nature of a disk having a peripheral flange $c$, and onto the threaded portion $b'$ I screw a sleeve D, which has several functions, one of which is to lock the part C and securely hold it against turning relatively to the hub of the wheel. The part C has a double duty to perform. When motion is to be transmitted from the driving to the driven member, it acts as the fixed member of the clutch, and when the brake is to be applied for retarding or arresting the rotation of the driven member it provides the friction-surface against which the brake-shoe acts. The part C has a hub $c'$, and the sleeve D has portions $d$ $d'$ of different diameters, resulting in a shoulder $d''$. The hub $c'$ and the part $d$ are of equal diameter, and they form a part of the bearing for the driving member A, which has a shoulder $a$, adapted to contact with the shoulder $d''$, whereby the outward lateral movement of the driving member is limited, clearance being left between the inner face of the member A and the part C, as shown at $a$, whereby a limited inward lateral movement of the driving member from the position shown in Fig. 2 is permitted. The driving member bears partly upon the hub $c'$, partly upon the portion $d$, and partly upon the portion $d'$ and is provided with a peripheral cam E, which preferably takes the form of an eccentric—that is to say, it is constructed upon a circle the axis of which is eccentric with relation to the axis of motion of the driving member, the axes of the driving and driven members being coincident. This eccentric occupies an eye of corresponding eccentricity in a part F, which takes the form of a disk having a peripheral flange $f$ projecting over the flange $c$ of the part C. The part F has a double duty to perform. When motion is to be transmitted from the driving to the driven member, it constitutes the movable member of the clutch, and when the rotation of the driven member is to be retarded or arrested it acts as the brake-shoe, for which purpose its inner face has contact with the outer face of the part C. The opposing surfaces of the flanges $c$ and $f$ are cylindrical, and the external diameter of the former is a trifle less than the internal diameter of the latter, the difference in their diameters being slightly exaggerated in the drawings for the sake of clearness of representation. The eccentric does not fit the eye of the part F tightly, but, on the contrary, the joint is sufficiently loose to allow the one to move easily within the other. While the parts are in the positions shown in Fig. 3 the flanges $c$ and $f$ are concentric and out of contact; but should the driving member be rotated in the direction of the arrow at a speed greater than that of the driven member the eccentric E will impinge against the eccentric surface of the eye of the part F, and thereby cause the part F to move transversely. (The term "transversely" as used here and in the claims has reference to the axis of rotation of the parts.) This movement of the part F, the part C remaining fixed, will cause the flange $f$ to impinge against the flange $c$, and by reason of the slight degree of eccentricity the flanges $c$ and $f$ may be forced together with sufficient friction to positively prevent their relative rotation, and in this way motion is transmitted from the driving to the driven member. On the other hand, should the motion of the driving member be arrested so that the driven member moves faster the part F will be carried forward by its frictional contact with the part C until the parts are returned to the positions shown in Fig. 3. If no means were provided to prevent it, this forward movement of the part F relatively to the driving member, or, what amounts to the same thing, the reverse movement of the driving member, would continue until the eccentric E had thrown the part F in the opposite direction far enough to cause the flanges $c$ and $f$ to impinge at a point diametrically opposite that at which they impinged when the eccentric was moved in the direction of the arrow and this would again lock the flanges together. For the purposes of my invention this is not desirable, and I therefore provide means for arresting the further relative rotation of the driving member and part F as soon as the flange $f$ has reached a position concentric with the flange $c$. To this end I provide a stop which may consist of a stud G, carried by the driving member, and a shoulder $f'$ on the part F, against which this stud bears, preferably through the medium of a screw $f''$. When the shoulder has come to a bearing on this screw, the driving member may be rotated in reverse direction (backward) and will carry with it the part F, and this reverse movement will apply the brake in the manner hereinafter described.

The driving member is provided with a plurality of cams H, (preferably four of them of equal length,) which are presented outward and are adapted to engage corresponding cams I on the inner face of a ring I', which is mounted loosely upon the portion $d'$ of the sleeve D, so as to be capable of both rotary and lateral movement thereon. On the outer face of this ring are a plurality of shoulders $i$, which are adapted to engage corresponding shoulders $j$ on a part J, which is fixed to the frame by some suitable means which will positively prevent it from turning. Preferably this part J takes the form of a cup-shaped disk, which has a central perforation for the passage of the axle K, and adjacent to this perforation it has a non-circular projection $j'$, adapted to enter the slot in the frame L, whereby it is held against rotation. This part J has a double function. It prevents the reverse movement of the ring I' after the shoulders $i$ have once come in contact with the shoulders $j$, and when this condition is reached it prevents the lateral movement of the ring I. Preferably the shoulders $i$ and $j$ are the result of providing the parts with what in mechanical effect amount to ratchet-teeth, each of which has a gradual slope on one side and on the other side terminates abruptly, the object of the slope being to effect the disengagement of the teeth and move the ring I' laterally toward the driving member when the latter rotates forward. With the parts thus constructed while the jaws of the clutch are in engagement and the driving member is rotating forward the abrupt shoulders $h$ at the forward extremities of the cams H will be in engagement with the abrupt shoulders $i'$ at the rear extremities of the cams I and said ring will rotate with the driving member. This is permitted by reason of the fact that the distance between the bases or lowest portions of the cams H and the summits of the shoulders *j* is slightly greater than the total width of the ring I', and hence while the ring is rotating with the driving member the shoulders *i* will move past the shoulders *j* without coming in contact with them. If now the movement of the driving member be reversed, so as to bring the parts to the positions shown in Fig. 2, and the clutch thereby opened, the movement of the driving member may be completely arrested, while permitting the driven member to continue its movement, and this is advantageous in a bicycle, since it enables the rider to coast with his feet resting upon the pedals, meanwhile holding them at rest. If, however, the reverse movement of the driving member be continued beyond the position shown in Fig. 2, the cams H will ride up on the cams I and move the ring I' laterally until the shoulders *i* come in contact with the shoulders *j*. This, as before stated, will arrest the further lateral and reverse rotary movement of the ring I', whereby it will become practically a fixed member, with cams on its inner face. By continuing the reverse movement of the driving member the cams H will ride farther up on the cams I, and in doing so the driving member will itself be moved laterally and will in turn move the part F, with which it has contact, laterally and force its inner face against the outer face of the part C. The frictional contact of these faces may be regulated by pressure upon the pedals, and in this way the rotation of the driven member may be retarded to any desired extent or it may be completely arrested.

By providing the driving member with a flange A', which projects over and fits with reasonable closeness the periphery of the disk J, and causing the driving member and the part F to overlap and causing the parts F and C to overlap the device is made practically dust-proof.

Having thus described my invention, the following is what I claim as new therein and desire to secure by Letters Patent:

1. The combination with a driving member and a driven member, of a clutch having two members one of which is movable transversely for the purpose of engaging and disengaging them, said movable member being provided with a circular opening, an eccentric carried by the driving member and occupying the circular opening of the movable member, whereby when the driving member is moved in one direction relatively to said movable member said member is moved transversely into engagement with the other member, and means for limiting the reverse movement of the driving member relatively to the movable member, substantially as set forth.

2. The combination with a driving member and a driven member, of a clutch having a fixed member carried by the driven member and a transversely-movable member having an opening through which the driven member passes, a cam carried by the driving member and occupying said opening, and a pin carried by the driving member and adapted to engage the movable member of the clutch for limiting the reverse movement of the driving member relatively to said movable member, substantially as set forth.

3. The combination with means for forward propulsion, including a driven member and a driving member, of a brake having a disk secured to the driven member and provided with a friction-surface, a brake-shoe, consisting of a disk having a friction-surface opposed to the friction-surface of the disk first aforesaid and being movable laterally relatively thereto, means actuated by the backward rotation of the driving member for moving the brake-shoe laterally to apply the brake, a fixed non-rotative part, and means whereby the braking-pressure is transmitted to and resisted by said part, substantially as set forth.

4. The combination with means for forward propulsion, including a driven member and a driving member capable of both lateral and rotary movement, of a brake having a disk carried by the driven member and provided with a friction-surface, a brake-shoe, consisting of a disk having a friction-surface opposed to the friction-surface of the disk first aforesaid said brake-shoe being capable of lateral movement and having engagement with the driving member, whereby it partakes of the lateral movement thereof, means actuated by the backward rotation of the driving member for moving the brake-shoe laterally to apply the brake, a fixed non-rotative part, and means whereby the braking-pressure is transmitted to and resisted by said part, substantially as set forth.

5. The combination with means for forward propulsion, including a driven member and a driving member capable of both rotary and lateral movement relatively thereto, of a disk carried by the driven member and having a friction-surface, a brake-shoe consisting of a disk having a friction-surface opposed to the friction-surface of the disk first aforesaid, said brake-shoe being capable of lateral movement and having engagement with the driving member, a part having cam-surfaces adapted to engage corresponding cam-surfaces on the driving member when the latter is rotated backward, whereby said driving member and the brake-shoe are moved laterally to apply the brake, a fixed non-rotative part, and means whereby the braking-pressure is transmitted to and resisted by said part, substantially as set forth.

6. The combination with means for forward propulsion, including a driven member and a driving member, of a brake having a laterally-movable brake-shoe, a part having a friction-surface with which it is adapted to engage, means for moving the brake-shoe laterally to apply the brake when the driving member is rotated backward, said means including a laterally-movable ring having cam-surfaces engaging corresponding cam-surfaces on the driving member, a fixed non-rotative part engaging said ring for resisting its lateral and backward movement when the driving member is rotated backward, substantially as set forth.

7. The combination with a driving member and a driven member, of a disk carried by the driven member, a second disk capable of both lateral and transverse movement relatively to the driven member, one of said disks having a peripheral flange adapted to be engaged by the other and both of said disks having friction-surfaces on their opposed faces, means actuated by the movement of the driving member in one direction for bringing the disks into engagement at their peripheries, and means actuated by the movement of the driving member in the opposite direction for bringing the disks into engagement at their faces, substantially as set forth.

8. In a combined clutch and brake having means for permitting the driven member to rotate forward while the driving member is at rest, the combination of the driven and driving members capable of free relative rotation, a clutch having two relatively-movable members, means for closing the clutch when the driving member is rotated forward, a brake having two friction-disks movable laterally relatively to each other, a ring capable of both lateral and rotary movement, said ring and driving member having cam-surfaces which engage when the driving member is rotated backward, and a fixed non-rotative part adapted to engage the ring and resist its lateral movement when the driving member is rotated backward, said fixed non-rotative part and ring having shoulders adapted to engage and prevent the backward rotation of the ring, substantially as set forth.

9. The combination with means for forward propulsion, including a driven member, and a driving member capable of both rotary and lateral movement relatively thereto, of a cam carried by the driving member, a ring capable of both rotary and lateral movement, having a cam adapted to engage the cam of the driving member, means for resisting the rotary and lateral movement of the ring when the movement of the driving member is reversed, whereby the engaging cams will cause the driving member to be moved laterally, a brake-shoe actuated by the lateral movement of the driving member, and a braking-surface with which the brake-shoe engages, substantially as set forth.

10. The combination with means for forward propulsion, including a driven member and a driving member capable of both rotary and lateral movement relatively thereto, of a cam carried by the driving member, a ring capable of both rotary and lateral movement, a cam carried by the ring and adapted to engage the cam of the driving member, a fixed part adapted to engage the ring for resisting its lateral movement in one direction and having shoulders adapted to engage corresponding shoulders on the ring for preventing the rotary movement of the ring, whereby when the driving member is rotated in reverse direction said cams will cause the driving member to move laterally, a brake-shoe actuated by said lateral movement of the driving member, and a braking-surface with which the brake-shoe engages, substantially as set forth.

LA FAYETTE CONWELL.

Witnesses:
ALLEN MCQUARRIE, Jr.,
CHARLES FISHER.